(12) United States Patent
Kim et al.

(10) Patent No.: US 7,684,614 B2
(45) Date of Patent: Mar. 23, 2010

(54) METHOD FOR MODELING THREE DIMENSIONAL SHAPE OF OBJECTS USING LEVEL SET SOLUTIONS ON PARTIAL DIFFERENTIAL EQUATION DERIVED FROM HELMHOLTZ RECIPROCITY CONDITION

(75) Inventors: Jae Chul Kim, Taejon (KR); Chang Woo Chu, Taejon (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 904 days.

(21) Appl. No.: 11/496,395

(22) Filed: Aug. 1, 2006

(65) Prior Publication Data

US 2007/0136034 A1     Jun. 14, 2007

(30) Foreign Application Priority Data

Dec. 8, 2005   (KR) .................. 10-2005-0119797

(51) Int. Cl.
*G06T 17/00* (2006.01)
(52) U.S. Cl. ...................................... 382/154; 345/419
(58) Field of Classification Search ................ 382/154, 382/285; 703/2; 345/419, 420
See application file for complete search history.

(56) References Cited

U.S. PATENT DOCUMENTS

| | | | |
|---|---|---|---|
| 6,590,669 | B1 | 7/2003 | Wagner |
| 2005/0074162 | A1 | 4/2005 | Tu et al. |
| 2006/0126929 | A1* | 6/2006 | Kim et al. .................. 382/154 |

OTHER PUBLICATIONS

Guillemaut et al. "Helmholtz Stereopsis on Rough and Strongly Textured Surfaces." Proceedings, 2nd International Symposium on 3D Data Processing, Visualization and Transmission, Sep. 6, 2004, pp. 10-17.*
Magda et al. "Beyond Lambert: Reconstructing Surfaces with Arbitrary BRDFs." Eighth IEEE International Conference on Computer Vision, vol. 2, Jul. 7, 2001, pp. 391-398.*
Todd E. Zickler et al.; "Binocular Helmholtz Stereopsis"; Proceedings of the Ninth IEEE International Conference on Computer Vision (ICCV'03).
Todd E. Zickler et al.; "Helmholtz Stereopsis: Exploiting Reciprocity for Surface Reconstruction"; International Journal of Computer Vision 49 (2/3); 2002; pp. 215-227.

* cited by examiner

*Primary Examiner*—Jon Chang
(74) *Attorney, Agent, or Firm*—Lowe Hauptman Ham & Berner, LLP

(57) ABSTRACT

A method for modeling a three dimensional shape of object using a level set solution on a partial differential equation derived from a Helmholtz reciprocity condition is provided. The method includes the steps of: a) inputting an image pair satisfying a Helmholtz reciprocity condition; b) performing an optical correction and simultaneously performing a geometric correction; c) performing a camera selection to select cameras capable of seeing a point (X, Y, Z), and defining and calculating a cost function by the Helmholtz reciprocity condition; d) calculating a speed function of a PDE that minimizes the cost function obtained in the step c); and e) generating a three dimension mesh model from a set of points configuring the object surface provided from the step d), and deciding a final three dimension mesh model by comparing cost function values.

7 Claims, 2 Drawing Sheets
(1 of 2 Drawing Sheet(s) Filed in Color)

METHOD FOR MODELING THREE DIMENSIONAL SHAPE OF OBJECTS USING LEVEL SET SOLUTIONS ON PARTIAL DIFFERENTIAL EQUATION DERIVED FROM HELMHOLTZ RECIPROCITY CONDITION

BACKGROUND OF THE INVENTION

1. Field of the Invention

The present invention relates to a method for modeling a three dimensional shape of object using a level set solution on a partial differential equation derived from a Helmholtz reciprocity condition, and more particularly, to a method of modeling three dimensional shape of object without reference to surface characteristics of the object by transforming constraints provided from a pair of images that satisfy the Helmholtz reciprocity condition to a partial difference equation and calculating the partial difference equation based on a level set.

2. Description of the Related Art

A three-dimensional scanner using a photometric stereo or a moiré patterned light was widely known as a conventional technology of reproducing a three-dimensional image of an object.

Recently, a Helmholtz stereo technology was introduced in an article entitled "Helmholtz Stereopsis: Exploiting Reciprocity for surface reconstruction" by Todd Zickler, Peter N, Belhumeur and David J. Kriegman, at International Journal of Computer Vision, Vol. 49 (2-3), pp. 215-227, 2002, 9-10. The Helmholtz stereo technology produces three-dimensional shape of an object using a Helmholtz reciprocity condition. The Helmholtz reciprocity condition denotes that the ratio of incident irradiance (on the object) to the reflected irradiance (from the object) is the same for each corresponding pixel on the reflected images.

The Helmholtz stereo is a technology for modeling a three-dimensional shape of an object using the Helmholtz reciprocity condition. As described above, the ratio of incident irradiance (on the object) to the reflected irradiance (from the object), i.e., the reflectance or the Albedo, is the same for each corresponding pixel on the reflected images. According to the Helmholtz stereo, a pair of images having incident irradiances and reflected irradiances exactly opposite one another is obtained by photographing the object with a camera and a light linearly positioned to face one another, and photographing the object again after rotating the camera and the lights at 180°. Such an image pair perfectly satisfies the Helmholtz reciprocity condition.

It is very hard to obtain a high quality three-dimensional image using a conventional scanner if a target object has particular surface characteristics such as a lustrous surface or a fur surface. However, the Helmholtz stereo technology may provide the high quality three-dimensional image although the target object has a lustrous surface or a fur surface.

Meanwhile, the image pair satisfying the Helmholtz reciprocity condition provides constraints that include information about a three-dimensional shape of an object. These constraints are transformed to a partial differential equation (PDE) for the shape of the object and the PDE is solved by applying a dynamic programming. Such a conventional technology was introduced in an article entitled "Binocular Helmholtz Stereopsis" by D. J. Kriegman, T. E. Zickler, J. Ho, J. Ponce and P. N. Belhumeur at International Conference on Computer Vision, Vol. 2, pp. 1411-1417, 2003. 10.

However, the Binocular Helmholtz Stereopsis technology reproduces a three-dimensional shape for a front surface only because the dynamic programming is only applicable to a relief The dynamic programming, furthermore, can be solvable only when a variable is one. That is, constraints from a target object having two variables cannot be completely reflected. Therefore, it is very hard to perfectly reproduce a three-dimensional shape of a target object using the Binocular Helmholtz Stereopsis technology.

SUMMARY OF THE INVENTION

Accordingly, the present invention is directed to a method for modeling a three dimensional shape of object using a level set solution on a partial differential equation derived from a Helmholtz reciprocity condition, which substantially obviates one or more problems due to limitations and disadvantages of the related art.

It is an object of the present invention to provide a method of modeling three dimensional shape of object without reference to surface characteristics of the object by transforming constraints provided from a pair of images that satisfy the Helmholtz reciprocity condition to a partial differential equation and calculating the partial differential equation based on a level set.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of modeling a three dimension shape of an object, including the steps of: a) inputting an image obtained using a camera and a light which are designed to satisfied to a Helmholtz reciprocity condition; b) performing an optical corrosion that decide a radiance of a light corresponding to a R, G, B color value of the image inputted at the step a) and simultaneously performing a geometric correction that calculates an internal parameter and an external parameter of a camera using a three dimensional lattice pattern; c) performing a camera selection to select cameras capable of seeing a point (X, Y, Z) of a surface of a three dimension object, and defining and calculating a cost function to determine how a given three dimension object is satisfied by the Helmholtz reciprocity condition; d) calculating a speed function of a partial differential equation defining a speed of a surface of an object that moves an object surface in a direction that minimizes the cost function obtained in the step c); and e) generating a three dimension mesh model from a set of points configuring the object surface provided from the step d), and deciding a final three dimension mesh model by comparing cost function values.

It is to be understood that both the foregoing general description and the following detailed description of the present invention are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the invention, are incorpo- In the drawings.

DETAILED DESCRIPTION OF THE INVENTION

Reference will now be made in detail to the preferred embodiments of the present invention, examples of which are illustrated in the accompanying drawings.

Figure 1:
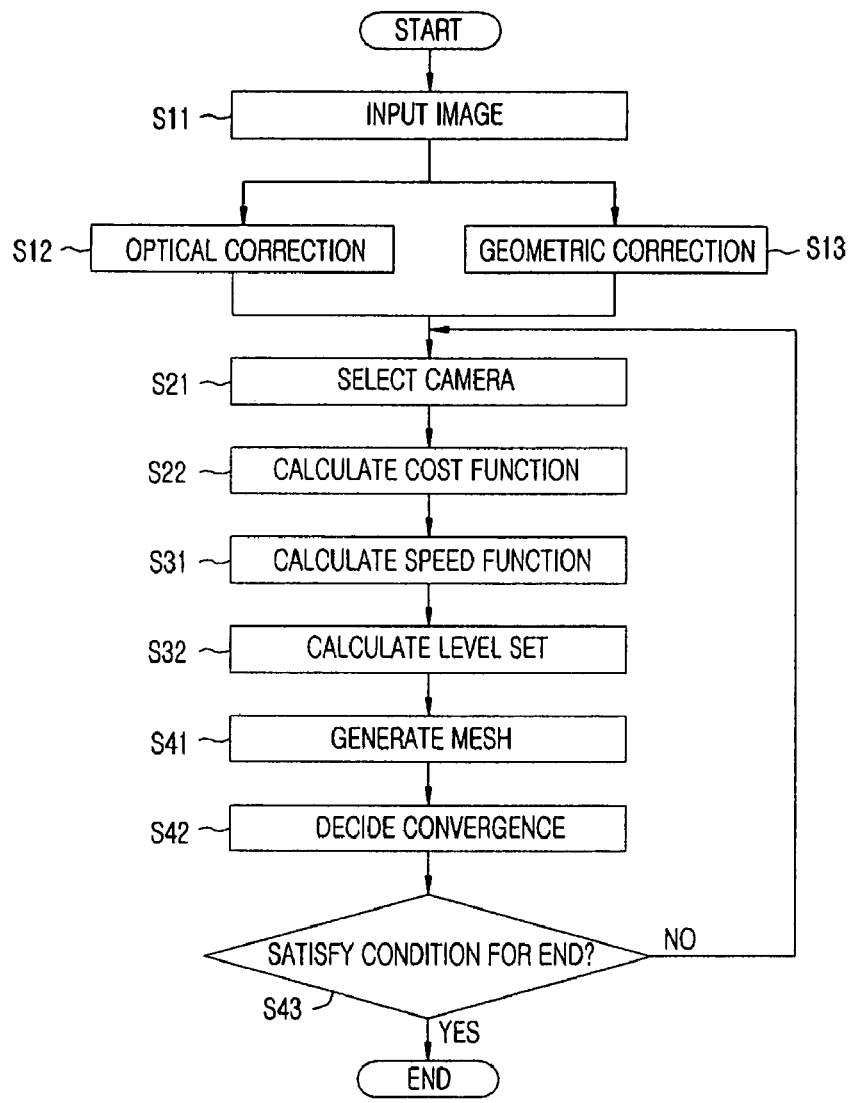
FIG. 1 is a flowchart showing a method for modeling a three-dimensional shape of an object according to an embodiment of the present invention.
Figure 2:
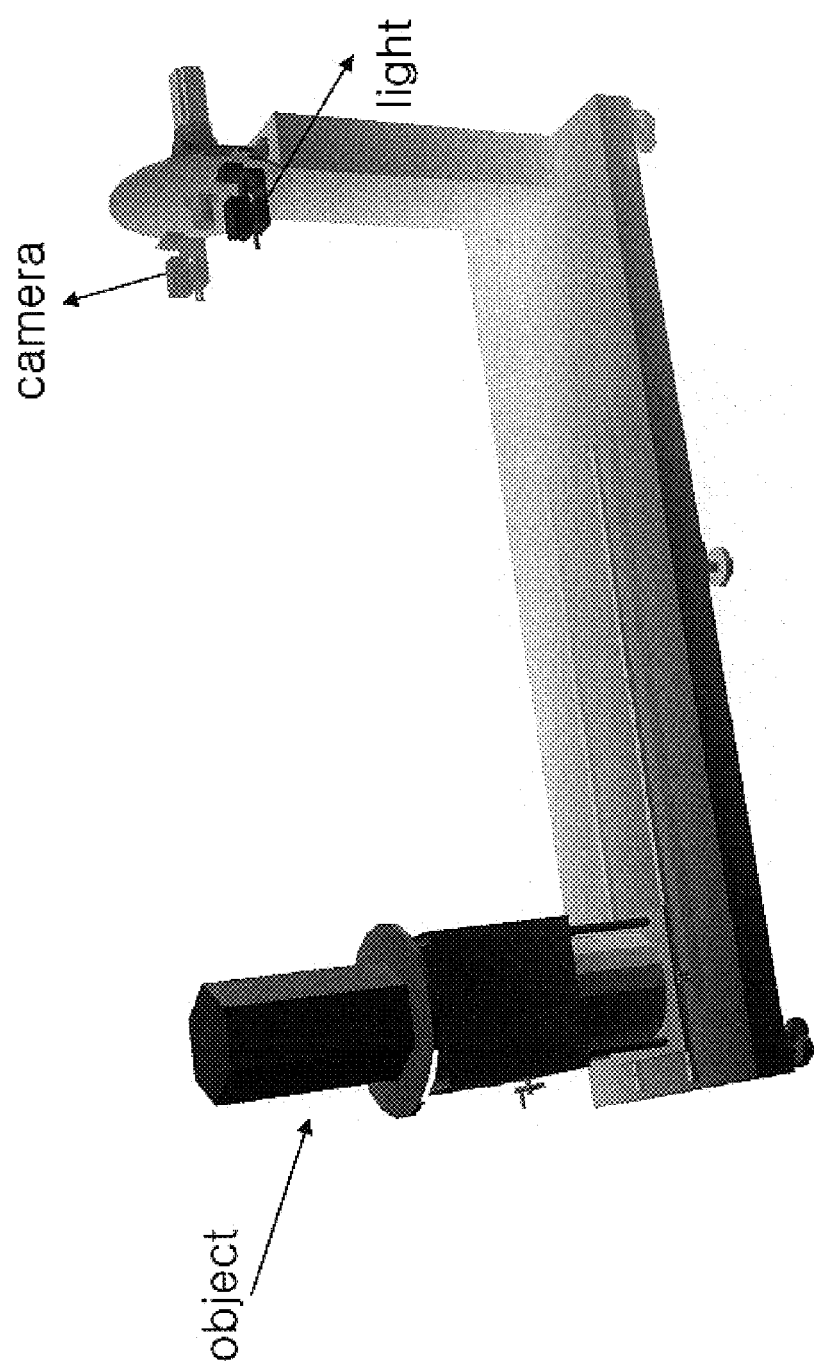
FIG. 2 is a view illustrating a hardware configuration for obtaining an image that satisfies a Helmholtz reciprocity condition as an image used in the modeling method according to the present invention.

FIG. 1 is a flowchart showing a method for modeling a three-dimensional shape of an object according to an embodiment of the present invention, and FIG. 2 is a view illustrating a hardware configuration for obtaining an image that satisfies a Helmholtz reciprocity condition as an image used in the modeling method according to the present invention.

Referring to FIGS. 1 and 2, an image satisfying the Helmholtz reciprocity condition is inputted at step S11. Herein, the image is obtained from the hardware configuration shown in FIG. 2. That is, a pair of images of the target object is photographed by changing positions of the camera and the light to obtain the image satisfying the Helmholtz reciprocity condition. The hardware configuration shown in FIG. 2 is designed to obtain such an image satisfying the Helmholtz reciprocity condition. That is, a camera and a light are linearly positioned to face each other and the object is photographed. Then, the locations of the camera and the light are rotated at 180° and then the object is photographed again.

Then, an optical correction is performed on the photographed image at the step S12 and a geometric correction is performed at step S13.

In the optical correction step S12, a radiance of a real light is decided corresponding to R, G, B color values of the photographed image. The optical correction is a process estimating a function $f$ outputting the radiance of the light corresponding to the received R, G, B color values. The optical correction is essential because the Helmholtz stereo uses the radiance of the real light irradiated to the CCD of the camera that generate the color values instead of using the R, G, B color values of the image. Since various methods for the optical correction are widely known, details thereof are omitted.

In the geometric correction step S13, internal parameters and external parameters of the camera are calculated using a three-dimensional lattice pattern. Herein, the internal parameters include a focus distance, a principal point and a CCD aspect ration, and the external parameter is configured of rotation and translation about a three dimensional reference coordinate. Through the geometric correction, how a point $(X, Y, Z)$ on the three dimensional reference coordinate is related to a two dimensional point $(x, y)$ can be determined. That is, following Eq. 1 shows the mapping relation thereof.

$$s \begin{pmatrix} x \\ y \\ 1 \end{pmatrix} = K[R \ t] \begin{pmatrix} X \\ Y \\ Z \\ 1 \end{pmatrix}, \quad \text{Eq. 1}$$

-continued
$$K = \begin{bmatrix} f & 0 & o_x \\ 0 & \alpha f & o_y \\ 0 & 0 & 1 \end{bmatrix}$$

In Eq. 1, K is a matrix for internal parameters, f denotes a focus distance of a camera, $\alpha$ denotes a CCD aspect ratio, and $(o_x, o_y)$ denotes a location of a camera focus. R denotes a 3×3 matrix that represents a rotation of a camera based on a reference coordinate, and t is a 3−1 matrix denoting a translation of a camera. S is a random scale constant. To calculate a camera parameter from a lattice pattern is also widely known to those skilled in the art. Therefore, details thereof are omitted.

After the optical correction step S12 and the geometric correction step S13, a camera selection step S21 and a cost function calculation step S22 are performed in sequence. Such steps S21 and S22 are an image processing steps. That is, in the image processing step, the constraints of the object are induced by receiving the radiance image of light obtained from the optical correction step S12 and the camera parameters from the geometric correction step S13, and the resulting thereof is expressed as a cost function. Herein, the cost function is defined for a point $(X, Y, Z)$ of a surface of the target object. It is possible to reproduce a shape of an object that well satisfies the Helmholtz reciprocity condition by transforming the surface of the target object in a direction minimizing the cost function. The minimization of the cost function may be calculated by a method of repeatedly updating the shape of the object, and an initial shape of the target object is randomly set, for example, a sphere, and a hexahedron.

In the camera selection step S21, only cameras that can see a point $(X, Y, Z)$ of a three-dimensional surface object are selected. The camera selection step is essential because the point $(X, Y, Z)$ may be invisible according to the location of the camera or the shape of the target object. That is, it is difficult to calculate the cost function if the image photographed by a camera that cannot see the point is related to calculate the cost function when the cost function of the point $(X, Y, Z)$ is calculated. A depth of a camera is embodied using a depth buffer. The depth buffer is defined by each pixel of a two dimensional image photographed by each camera, and it records the shortest distance to an object corresponding to one pixel $(x, y)$ of the image photographed by the camera when a three-dimensional object is provided. Therefore, a corresponding lattice point is a point that the camera cannot see if an image coordinate generated by applying the point $(X, Y, Z)$ to Eq. 1 is $(x, y)$ and a depth buffer value Z1 of $(x, y)$ is smaller than Z. And, an image pair of the corresponding camera is not used to calculate the cost function of the point $(X, Y, Z)$.

In the step S22 for calculating the cost function, it defines a cost function that measures how well the provided three-dimensional object satisfies the Helmholtz reciprocity condition. The cost function is defined for a point $(X, Y, Z)$ of a surface of a three-dimensional object. The smaller the cost function is, the more accurately satisfied, the Helmholtz reciprocity condition is. The cost function is defined as following Eq. 2.

$$\Phi = \sum_{k=1}^{n} \left( \frac{p_{k,1}|\overline{C_{k,1}} - \overline{X}|^2}{\overline{N} \cdot (\overline{C_{k,1}} - \overline{X})} - \frac{p_{k,2}|\overline{C_{k,2}} - \overline{X}|^2}{\overline{N} \cdot (\overline{C_{k,2}} - \overline{X})} \right)^2 \qquad \text{Eq. 2}$$

In Eq. 2, n denotes the number of camera pairs selected in the camera selection step for the point (X, Y, Z). $\overline{C_{k,1}}$ and $\overline{C_{k,2}}$ are a 3×1 column vector representing an incident center position of two cameras of a $k^{th}$ image pair, and it is calculated by $\overline{C_{k,i}} = -R_i^{-1} t_i$ (i=1,2). Herein, $R_i$ and $t_i$ are a camera rotation matrix and a translation vector obtained in the geometric correction step S13. $\overline{N}$ is an normal vector of an object in a point (X, Y, Z), and $\overline{X}$ denotes the point (X, Y, Z). ● represents a dot product of two vectors. And, $P_{k,1}$ and $P_{k,2}$ are defined as following Eq. 3.

$$p_{k,i} = G(\sigma_{k,i}) \otimes I_{k,i}(x_{k,i}, y_{k,i}),$$

(i=1,2)

$$\sigma_{k,i} = s|\nabla I_{k,i}(x_{k,i}, y_{k,i})| \qquad \text{Eq. 3}$$

In Eq. 3, $I_{k,i}(x_{k,I}, y_{k,i})$ (i=1,2) denotes the radiances of the light in two dimensional coordinates $(x_{k,1}, y_{k,1})$, $(x_{k,2}, y_{k,2})$ which are mapped to the point (X, Y, Z) through Eq. 1. $G(\sigma_{k,i})$ (i=1,2) is a Gaussian function having a standard deviation σk,i. $\otimes$ denotes an operator for a convolution calculation. $\nabla 1_{k,i}(x_{k,i}, y_{k,i})$ denotes a size of a differential vector of an image $I_{k,I}$ at a point $(x_{k,I}, y_{k,i})$. The different vector may be calculated using a differential equation related to general image such as Laplacian of Gaussian (LOG) or Sobel. And, s is a constant for scaling. That is, Eq. 3 calculates $P_{k,I}$ by applying the Gaussian function into the image, wherein the Gaussian function generates a larger standard deviation in proportional to a variation amount of brightness values at $(x_{k,i}, y_{k,i})$. Therefore, the sampling artifacts problem can be lightened, which is seriously generated in proportional to the variation amount of brightness value.

After the cost function is completely calculated at step S22, a speed function is calculated at step S31 and a level set is calculated at step S32. That is, the steps S31 and S32 are a level set processing step. In the level set processing step, it calculates a shape of object that minimizes the cost function obtained in the cost function calculation step S22. That is, it configures a partial differential equation (PDE) that defines a speed of a surface of an object that travels in a direction minimizing the cost function, and then, the PDE is solved using a level set method.

At first, a partial differential equation (PDE) that defines a speed of a surface of an object that travels in a direction minimizing the cost function is calculated using an equation introduced by Hailin Jin, Oliver Faugeras, at al at step S31. Hailin and Oliver induce a speed $S_t$ moving a point (X, Y, Z) to minimize a cost function Φ. As a result, the PDE is defined as following Eq. 4.

$$S_t = (2H\Phi - \overline{\Phi_X} \cdot \vec{N} - 2H(\overline{\Phi_N} \cdot \vec{N}))\vec{N} \qquad \text{Eq. 4}$$

In Eq. 4, definitions of $\overline{N}$, $\overline{X}$ and ● are identical to Eq. 2. H is an average curvature of an object at a point (X, Y, Z), and $\overline{\Phi_X}$ is a partial differential value of a cost function Φ for $\overline{X}$. For the cost function in Eq. 2, $\overline{\Phi_X}$ and $\overline{\Phi_N}$ can be expressed as a following Eq. 5.

$$\overline{\Phi_X} = 2 \sum_{k=1}^{n} \left( \frac{p_{k,1}|\overline{C_{k,1}} - \overline{X}|^2}{\overline{N} \cdot (\overline{C_{k,1}} - \overline{X})} - \frac{p_{k,2}|\overline{C_{k,2}} - \overline{X}|^2}{\overline{N} \cdot (\overline{C_{k,2}} - \overline{X})} \right) \qquad 5$$

$$\left\{ \left( \frac{\frac{\partial p_{k,1}}{\partial \overline{X}}|\overline{C_{k,1}} - \overline{X}|^2}{\overline{N} \cdot (\overline{C_{k,1}} - \overline{X})} - 2\frac{p_{k,1}(\overline{C_{k,1}} - \overline{X})}{\overline{N} \cdot (\overline{C_{k,1}} - \overline{X})} + \frac{p_{k,1}|\overline{C_{k,1}} - \overline{X}|^2}{|\overline{N} \cdot (\overline{C_{k,1}} - \overline{X})|^2}\overline{N} \right) - \left( \frac{\frac{\partial p_{k,2}}{\partial \overline{X}}|\overline{C_{k,2}} - \overline{X}|^2}{\overline{N} \cdot (\overline{C_{k,2}} - \overline{X})} - 2\frac{p_{k,2}(\overline{C_{k,2}} - \overline{X})}{\overline{N} \cdot (\overline{C_{k,2}} - \overline{X})} + \frac{p_{k,2}|\overline{C_{k,2}} - \overline{X}|^2}{|\overline{N} \cdot (\overline{C_{k,2}} - \overline{X})|^2}\overline{N} \right) \right\}$$

$$\overline{\Phi_N} = 2 \sum_{k=1}^{n} \left( \frac{p_{k,1}|\overline{C_{k,1}} - \overline{X}|^2}{\overline{N} \cdot (\overline{C_{k,1}} - \overline{X})} - \frac{p_{k,2}|\overline{C_{k,2}} - \overline{X}|^2}{\overline{N} \cdot (\overline{C_{k,2}} - \overline{X})} \right)$$

$$\left( \frac{p_{k,2}|\overline{C_{k,2}} - \overline{X}|^2}{|\overline{N} \cdot (\overline{C_{k,2}} - \overline{X})|^2}(\overline{C_{k,2}} - \overline{X}) - \frac{p_{k,1}|\overline{C_{k,1}} - \overline{X}|^2}{|\overline{N} \cdot (\overline{C_{k,1}} - \overline{X})|^2}(\overline{C_{k,1}} - \overline{X}) \right)$$

In Eq. 5, $$\frac{\partial p_{k,i}}{\partial \overline{X}}$$

can be expressed as following Eq. 6.

$$\frac{\partial p_{k,i}}{\partial \overline{X}} = \frac{\partial \vec{x}}{\partial \overline{X}} \nabla (G(\sigma_{k,i}) \otimes I_{k,j}(x_{k,i}, y_{k,i})) \qquad \text{Eq. 6}$$

In Eq. 6, $G(\sigma_{k,i}) \otimes I_{k,j}(x_{k,i}, y_{k,i})$ is identical to Eq. 3, and $\nabla(G(\sigma_{k,i}) \otimes I_{k,j}(x_{k,i}, y_{k,i}))$ denotes a 2×1 differential vector of a convoluted image $G(\sigma_{k,i}) \otimes I_{k,j}(x_{k,i}, y_{k,i})$.

$$\frac{\partial \vec{x}}{\partial \overline{X}}$$

is a 3×2 partial differential matrix $\vec{x} = (x_{k,i}, y_{k,i})$ of an image coordinate $\vec{X} = (X, Y, Z)$. It can be easily calculated from a relation of $\vec{x} = (x_{k,i}, y_{k,i})$ and $\vec{X} = (X, Y, Z)$.

In the level set calculation step S32, it calculates a shape of an abject that minimizes a cost function induced from the Helmholtz reciprocity condition and a speed function of Eq. 4 provided in the speed function calculation step S31. Herein, a level set method is used to solve a PDE type speed function. The level set method is a PDE calculation method introduced by Stanley Osher and J. A. Sethian as following Eq. 7.

$$\phi_t + \vec{VN} \bullet \nabla \phi = 0 \qquad \text{Eq. 7}$$

In Eq. 7, Φ is a scalar function for a point (X, Y, Z) denoting a level set. $\Phi_t$ Denotes a partial differential value for a level set at a time t. V is a speed of a surface of an object in a direction of a normal vector $\vec{N}$. Since the speed in the normal vector direction is already calculated, $\vec{VN}$ is $S_t$ of Eq. 4. $\nabla_\phi$ is a gradient of a level set for a point (X, Y, Z). If a level set moves according to a given speed function while updating the level set at a time t, a set of points (X, Y, Z) having Φ=0 at time t forms a surface of an object at a time t and the surface of the object moves in a direction to reduce the cost function of Eq. 2. Accordingly, the final result is obtained.

In order to generate a three-dimensional model, a mesh generating step S41 and a convergence deciding step S42 are performed in sequence. That is, a three-dimensional model is generated by generating a three-dimensional mesh model from the set of points configuring an object surface at a time t, and checking a condition of finishing a level set calculation.

In the mesh generation step S41, a three-dimensional mesh model is generated from three dimensional points obtained from the level set calculation step S32 using a marching cube method.

In the convergence deciding step S42, it compares cost function values $\Phi_1$ of three dimensional points provided at a previous time ti in the level set calculation step S32 and a cost function value $\Phi_2$ at a current time $t_2=t_1+1$. If the difference between the cost functions is not larger than a predetermined value, a counter increases by one. If the counter continuously increases more than predetermined times, the level set calculation step S32 is stopped and a three dimensional model generated at the current time is decided as a final object model. Then, a termination condition is checked at step S43, for example, it determines whether a time t is larger than a predetermined size. If the termination condition is satisfied, the current algorithm ends. If not at step S43, the three dimensional mesh model obtained at step S41 is transmitted to the step S21 and following steps of the step S21 are repeatedly performed.

As described above, the three dimension modeling method according to the present invention calculates a shape of an object by fully reflecting the constraints generated by the Helmholtz reciprocity condition differently from the conventional Helmholtz Stereo method. Therefore, the three dimension modeling method according to the present invention can accurately reproduce the three-dimensional shape of the object. Furthermore, the three dimension modeling method according to the present invention can reproduce three dimensional shape of a front, a rear and side surfaces of a target object although the conventional method reproduces three dimensional shape of a relief only. Moreover, the three dimension modeling method can obtain a shape of an object having a glare surface and a fur surface because the present invention can reproduce a three-dimensional shape regardless of the surface characteristics of the object.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of modeling a three dimension shape of an object, comprising the steps of:
   a) generating an image using a camera and a light, wherein the image satisfies a Helmholtz reciprocity condition;
   b) optically correcting the image inputted at the step a) includes determining a light radiance corresponding to a R, G, B color value of the image inputted at the step a) and simultaneously performing a geometric correction that determines how a point (X, Y, Z) on a three dimensional reference coordinate relates to a two dimensional point by calculating an internal parameter and an external parameter of the camera of step a) using a three dimensional lattice pattern;
   c) selecting cameras capable of seeing the point (X, Y, Z) of a surface of a three dimensional object, and defining and calculating a cost function value to determine how well a given three dimensional object is satisfied by the Helmholtz reciprocity condition;
   d) calculating a speed function of a partial differential equation defining a speed at which a surface of an object is transformed into a shape that minimizes the cost function obtained in the step c); and
   e) generating a three dimensional mesh model from a set of points configuring the object surface provided from the step d), and selecting a final three dimensional mesh model by comparing cost function values.

2. The method of claim 1, further comprising photographing a target object to obtain a pair of images that satisfy the Helmholtz reciprocity condition by changing positions of the camera and the light before the step a), wherein the pair of images is obtained through photographing the target object by linearly positioning the camera and the light to face one another and photographing the target object again by rotating the position of the camera and the light at 180°.

3. The method of claim 1, wherein in the step b), the camera internal parameter is configured of a focus distance, a principal point and a charge coupled detector (CCD) aspect ratio, and the camera external parameter is configured of a rotation and a translation for a three dimension reference coordinate.

4. The method of claim 1, wherein in the step c), the cost function Φ is expressed by $$\Phi = \sum_{k=1}^{n} \left( \frac{p_{k,1}|\overline{C_{k,1}} - \overline{X}|^2}{\overline{N} \cdot (\overline{C_{k,1}} - \overline{X})} - \frac{p_{k,2}|\overline{C_{k,2}} - \overline{X}|^2}{\overline{N} \cdot (\overline{C_{k,2}} - \overline{X})} \right)^2$$

where n denotes the number of cameras selected in the camera selection step c) for the point (X, Y, Z), $\overline{C_{k,1}}$ and $\overline{C_{k,2}}$ are a 3 ×1 column vector representing an incident center position of two cameras of a $k^{th}$ image pair, and calculated by $\overline{C_{k,i}} = -R_i^{-1} t_i$ (i=1,2), $R_i$ and $t_i$ are a camera rotation matrix and a translation vector obtained in the geometric correction step b), $\overline{N}$ is an normal vector of an object in a point (X, Y, Z), $\overline{X}$ denotes the point (X, Y, Z), ● represents a dot product of two vectors, $P_{k,1}$ and $P_{k,2}$ are defined as, $p_{k,i}=G(\sigma_{k,i})\otimes I_{k,i}(x_{k,i}, y_{k,i})$, (i=1,2)

$\sigma_{k,i}=s|\nabla I_{k,i}(x_{k,i}, y_{k,i})|$ wherein $I_{k,i}(x_{k,i}, y_{k,i})$(i=1,2) denotes the radiances of the light in two dimensional coordinates $x_{k,1}$, $y_{k,1}$), ($x_{k,2}$, $y_{k,2}$) mapped to the point (X, Y, Z), $G(\sigma_{k,i})$(i=1,2) is a Gaussian function having a standard deviation $\sigma_{k,i}$, $\otimes$ denotes an operator for a convolution calculation, and $\nabla 1_{k,i}$ ($x_{k,i}$, $y_{k,i}$) denotes a size of a differential vector of an image $I_{k,I}$ at a point ($x_{k,I}$, $y_{k,I}$).

5. The method of claim 4, wherein the speed function is calculated by applying the cost function Φ defined at the step c) into speed function $S_t$:

$S_t = (2H\Phi - \vec{\Phi}_X \bullet \vec{N} - 2H(\vec{\Phi}_N \bullet \vec{N})) \vec{N}$.

6. The method of claim 5, wherein in the step d), the calculated speed function $S_t$ is used to configure equation:

$\phi_t + V\vec{N} \bullet \nabla\phi = 0$ and a level set method is used to evaluate the equation, where $\Phi$ is a scalar function for a point (X, Y, Z) denoting a level set, $\Phi_t$ denotes a partial differential value for a level set at a time t, and V is a speed of a surface of an object in a direction of a normal vector $\vec{N}$.

7. The method of claim 1, wherein in the step c), the camera is selected by checking a visibility of each camera to a predetermined point on a surface of an object using a depth buffer.

* * * * *